United States Patent
Spencer (10) Patent No.: US 6,374,978 B1
(45) Date of Patent: Apr. 23, 2002

(54) TRANSMISSION LOCK

(75) Inventor: Joseph C. Spencer, Bronson, MI (US)

(73) Assignee: Douglas Autotech Corporation, Bronson, MI (US)

( * ) Notice: Subject to any disclaimer, the term of this patent is extended or adjusted under 35 U.S.C. 154(b) by 0 days.

(21) Appl. No.: 09/551,983

(22) Filed: Apr. 15, 2000

Related U.S. Application Data (60) Provisional application No. 60/129,809, filed on Apr. 16, 1999.

(51) Int. Cl.$^7$ ................................................. B60K 41/28
(52) U.S. Cl. .................................................. 192/220.3
(58) Field of Search .............................. 192/220, 220.2, 192/220.3; 74/473.23, 473.24, 473.3

(56) References Cited

U.S. PATENT DOCUMENTS

| | | | |
|---|---|---|---|
| 3,939,939 A | | 2/1976 | Okazaki |
| 3,948,339 A | * | 4/1976 | Iwanaga ..................... 180/269 |
| 3,960,235 A | | 6/1976 | Iijima |
| 4,033,158 A | | 7/1977 | Chamberlain |
| 4,096,930 A | * | 6/1978 | Viscardi ..................... 180/271 |
| 4,252,219 A | | 2/1981 | Kauffman |
| 4,473,141 A | * | 9/1984 | Mochida ............... 192/220.2 X |
| 4,585,103 A | | 4/1986 | Kuwayama |
| 4,610,336 A | | 9/1986 | Kuwayama |
| 4,817,405 A | | 4/1989 | Gentry |
| 4,827,787 A | | 5/1989 | Gillingham |
| 4,991,700 A | * | 2/1991 | Koga ....................... 192/220.3 |
| 5,181,592 A | * | 1/1993 | Pattock ..................... 192/220.3 |
| 5,211,271 A | * | 5/1993 | Osborn et al. ........... 192/220.3 |
| 5,379,872 A | | 1/1995 | Dorr |
| 5,609,049 A | | 3/1997 | Rundle |
| 6,006,887 A | | 12/1999 | Tazai |

* cited by examiner

*Primary Examiner*—Charles A Marmor
*Assistant Examiner*—Saúl Rodríguez
(74) *Attorney, Agent, or Firm*—Barry C. Kane; Miller, Johnson, Snell & Cummiskey, PLC (57) ABSTRACT

A transmission shifter assembly is provided having a lever cooperating with at least one linking lever such that movement of the lever results in a corresponding movement of one of the linking lever to select a desired gear, an assembly for selectively locating the lever at a desired gear selection position, and at least one fluid locking assembly cooperating with the locating assembly for locking the lever in a desired position and preventing accidental disengagement. The fluid locking assembly includes at least one linear actuator whose movement is controlled by a magneto rheological fluid.

23 Claims, 4 Drawing Sheets

TRANSMISSION LOCK

This application claims benefit of Prov. Ser. No. 60/129,809 filed Apr. 16, 1999.

BACKGROUND OF THE INVENTION

1. Field of the Invention

The present invention relates generally to a mechanical locking system and particularly to a brake-transmission interlock system (BTSI) for a motor vehicle.

2. Description of the Related Art

Locking arrangements for selector levers of a motor vehicle transmission have been required in. U.S. vehicles for a substantial number of years. The purpose of these devices is to prevent accidental engagement of the vehicle. Relatively more recently, regulations have required systems where the operator must engage the braking mechanism before moving the selector lever to the desired gear.

Traditionally, vehicles having these types of brake-transmission interlock systems must be moved out of a neutral position (parking or neutral) into a driving position in order to be able to drive the vehicle. The vehicle may start to drive, although this is not intended, when, while the engine is running, the selector lever is inadvertently moved from the neutral position into a driving position. An unattended abrupt acceleration may also occur during the warmup phase of the engine, when the idling speed is increased and the selective lever is brought into a driving position.

In order to avoid such circumstances, it is known to provide a locking arrangement for the selector lever, particularly for automatic vehicle transmissions, in which a locking member locks the selector lever when the brake is not operated. The locking member engages in corresponding indentations of an adjustable pawl so that the selector level is locked in the neutral position (parking or neutral).

U.S. Pat. No. 5,379,872 discloses a locking assembly for an automatic transmission selector lever which includes a locking member arranged on the selector lever, and an adjustable pawl. The adjustable pawl has indentations into which the locking member engages when the brake is not operated so that the selector lever is locked in the neutral position. The pawl has steeply extending flanks which bound the indentations where the locking member rests when the selector lever is locked and an actuating force is applied to the selector lever. The actuating force is introduced into the flanks of the pawl via contact surfaces of the selector lever at a contact point of the flanks. The flanks provide a substantially horizontal force component and a substantially vertical force component of the actuating force. As a result, the locking arrangement permits a secure unlocking when there are high operating forces on the locked selector lever. Contact in this manner, the actuating force applied to the selector lever is introduced in the pawl. On the steep flanks, the introduced force is transferred into an almost horizontal component pointing in the direction of the pivot of the pawl and into a downward-directed component which acts as an almost vertical supporting force. In this case, the steep flanks have the effect that the supporting force is a low range which is clearly exceeded by the horizontal component. As a result, the supporting force can act upon the components holding the pawl in the locked position only with a low power. As a result, the components can be removed from the pawl by low forces, whereby the pawl, while unlocking the selector lever, disengages from the locking member.

U.S. Pat. No. 4,817,405 discloses a lock for an automatic transmission shifter lever which prevents the transmission of the vehicle from being inadvertently shifted out of the parked position while the vehicle is running. In that particular invention, a sleeve or collar is received about a steering column in the vehicle. Mounted on the sleeve is a gear shift lever which can be selectively manipulated to select the desired gear. As the gear shift lever is manipulated, the sleeve or collar rotates about a central shaft of the steering column. A lock, including a rotatable lock cylinder, is mounted near the gear shift lever in the outer casing of the steering column. The lock extends inwardly and adjacent the sleeve or collar. A flange or ear extends radially from the lock cylinder and can be rotated between a free and locked position only by the aid of a key which will operate the lock. The sleeve or collar includes a receiving slot which, when the gear shift lever is moved to the park position, is adjacent the extending flange or ear of the lock. The flange or ear can thus be rotated into the slot by the key to the lock thereby preventing accidental manipulation of the gear shift lever out of the park position.

U.S. Pat. No. 4,610,336, an automatic transmission locking mechanism is disclosed which includes a lever rotatively interlocked with a manual shift lever, a rod adapted to be advanced or retracted by the lever, a parking gear, a pawl having a detent to be engaged with the parking gear, a cam moved on the rod for pushing up the pawl with a detent in shifting the manual shift lever to the parking position, a bracket on which the cam runs and a spring for releasing the pawl from the parking gear and to retain the pawl at the released position. The pawl is adapted to be turned on a pawl shaft, and a plate-shaped clamp is fitted in a grove formed in the pawl shaft at the free end thereof to restrain the actual movement of the pawl. The clamp is fixed to a case with a bolt with a spring disposed nearby the free end of the pawl and the sleeve can easily be fitted on or removed from the pawl shaft by fastening or removing, respectively the bolt fixing the clamp. Other examples of transmission locking mechanisms can be found in U.S. Pat. Nos. 4,585,103; 4,252,219; 4,033,158; 3,960,235; 3,948,339; and 3,939,939.

A significant disadvantage with substantially all of the aforementioned transmission interlock systems is they often require complicated mechanical linkages and assemblages or electrical circuits and solenoids to engage or disengage the pawls locking the transmission shifter in place. The purpose of the invention is to produce a reliable brake transmission interlock system requiring fewer components and resulting in a less costly assembly.

SUMMARY OF THE INVENTION

According to one form of the invention, a brake transmission interlock system for a transmission shifter assembly is provided which includes a selector lever cooperating with at least one linking lever such that the movement of the selector lever results in a corresponding movement of one of the linking levers to select a desired gear. An assembly for selectively locating the lever at a desired gear selection position is provided in association with at least one fluid locking assembly cooperating with the locating assembly to lock the selector lever in a desired position, preventing accidental disengagement. The fluid locking assembly includes at least one linear actuator whose movement is controlled by a magneto rheological fluid.

In another form of the invention, a transmission shifter assembly includes a selector lever having a first end and a second end, the second end interconnected to at least one linking lever such that the movement of the first end of the selector lever results in a corresponding movement of the linking lever. A positioning plate is located adjacent the base of the selector lever and includes at least one aperture configured to receive a locking assembly associated with the selector lever to selectively fixing a location of the lever. Connected to the locating assembly is at least one fluid locking member which selectively permits movement of the locating assembly with respect to the aperture. In further embodiment of the invention, an assembly is provided which cooperates with the lever to produce a magnetic field about the fluid locking member when the selector lever is in a predetermined position. Additionally, at least one of a braking operation and a key operation cooperates with the magnetic field assembly to selectively lock and unlock the fluid locking member.

In yet another form of the invention, the transmission shifter assembly includes a lever having a lower end coupled to at least one linking lever such that the movement of the lever assembly results in a movement of the linking lever to select a desired gear. A pawl is attached to the lower end of the lever assembly and is moveable between a first and second position. Connected to the pawl is an actuator assembly configured to selectively move the pawl between a first and second position. Adjacent the lever is a positioning plate having a plurality of detents configured to receive at least a portion of the moveable pawl to selectively fix a position of the lever assembly. In still a further form of the invention, at least one of the braking operating and key operation cooperates with the actuator assembly to selectively lock and unlock the actuator assembly.

In the most basic form of the invention, a magneto rheological fluid locking member comprises the principal element of the brake transmission interlock system, providing the interconnecting element between the locking pawl of the shifter assembly and a release button engaged by the operator. The magneto rheological fluid locking member cooperates with at least one of a braking operation and key operation to selectively engage and disengage a magnetic field which alters the operational characteristics of the assembly.

DETAILED DESCRIPTION OF THE VARIOUS EMBODIMENTS

Figure 1:
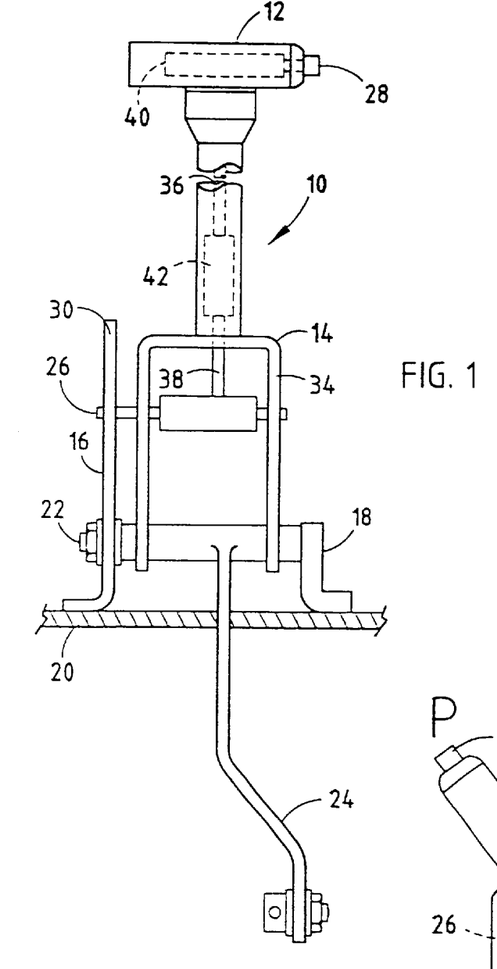
FIG. 1 is schematic view of one embodiment of a brake-transmission interlock system embodying the present invention.

For purposes of the following description, the terms "upper," "lower," "left," "rear," "front," "vertical," "horizontal" and derivatives of such terms shall relate to the invention as oriented in FIG. 1. However, it is to be understood that the invention may assume various alternative orientations, except where expressly specified to the contrary. It is also to be understood that the specific devices and processes illustrated in the attached drawings, and described in the following specification are simply exemplary embodiments of the inventive concepts defined in the appended claims. Specific dimensions and other physical characteristics relating to the embodiments disclosed herein are not to be considered as limiting, unless the claims expressly state otherwise.

As mentioned above, one of the principal objects of invention is to replace a substantial number of interconnected components with a single, more reliable component to complete a brake: transmission interlock system. In its most rudimentary form, the invention includes a non-Newtonian flow fluid locking mechanism, such as a magneto rheological fluid locking member, in cooperation with at least one of a braking operation or a key operation, to engage and disengage a locking pawl to prevent accidental engagement of the vehicle transmission. In more simpler terms, a fluid locking member is connected to the locking pawl of the shift lever assembly enabling the operator to shift the selector lever out of the park or neutral position when the operator has the brakes applied and the ignition is on. It is further contemplated that the magnetic sources connected to the locking mechanism is at a position proximate the first fluid locking member when the selector lever is in the first position to selectively lock and unlock the selector lever. In one embodiment of the invention, the magnetic source includes two components comprised of a permanent magnetic, and an electromagnet or coil proximate the permanent magnet to neutralize the field produced by the permanent magnet and unlock the fluid locking member. It is also contemplated that a second fluid locking member may be disposed at an end of the selector lever to enable the operator to selectively actuate the first fluid locking member. The first fluid locking member may include a tubular housing having an intermediate restriction and at least one piston disposed within the tubular housing. A magneto rheological fluid is preferably used to fill the remainder of the housing. The flow characteristics of the magneto rheological fluid are transformed by the presence or absence of an electromagnetic field around the restriction, thus locking and unlocking movement of the piston enclosed therein. To permit equalization of the fluid after the system has been reset, a check valve is disposed within the tubular housing which permits one way flow of the magneto rheological fluid around the restriction.

In another form of the invention, the transmission shifter assembly includes a lever assembly coupled at a lower end to at least one linking lever such that movement of the lever assembly results in movement of the linking lever to select a desired gear. A pawl is attached to the lower end of the lever assembly and moveable between a first and second position. An actuator assembly is connected to the pawl for moving the pawl between the first and second positions. The pawl engages a positioning plate having a plurality of detents therein to selectively fix the position of the lever assembly. To lock and unlock the actuator assembly, a circuit is provided in cooperation with at least a braking operation and a key operation to create or neutralize the magnetic field adjacent the actuator assembly. As in the previous embodiment, the magnetic field may be produced by a permanent magnet and neutralized by a coil or other electromagnetic source which counteracts the field produced by the permanent magnet.

For a better understanding of the most rudimentary form of the invention, and various embodiments of the invention, the reader is referred to FIGS. 1–4 wherein a hypothetical gear selector lever assembly 10 is shown for a motor vehicle. The gear selector lever assembly 10 may include a hand grip 12 at an upper end and a clevis 14 at a lower end. First and second brackets 16 and 18 may be spaced apart from each other and mounted on the floor 20 of the vehicle to rotatably support a shaft 22 to which the clevis 14 is secured. The selector lever assembly 10 may be pivotal around the axis of the shaft 22 by manipulating the hand grip 12 between a plurality of angular positions which correspond to a gear selector position such as "P" for parking, "R" for reverse, "N" for neutral, "D" for automatically shifting forward driving gear ratios, "2" to lock up second gear and "1" for locking up first gear as shown by the solid letters in FIG. 2. At least one linking lever 24 may be connected with the shaft 22 and interconnected to at least one corresponding linking lever (not shown) at the transmission, so that movement of the selector lever 10 causes a gear changing operation in the transmission.

Figure 2:
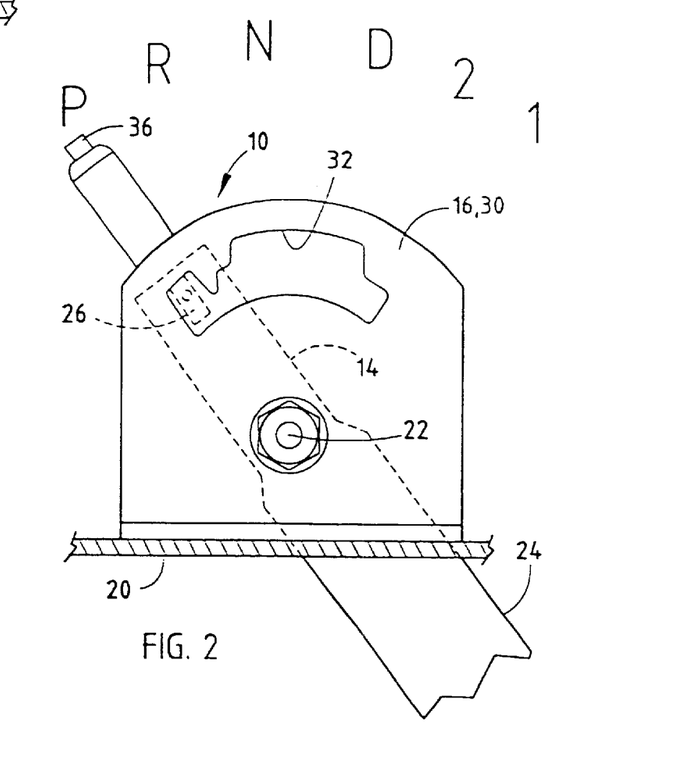
FIG. 2 is a schematic side view of a portion of the brake-transmission interlock system taken along a line 2—2 of FIG. 1.

In the schematic shown, the selector lever assembly 10 may include a lower rod or pawl 26 which may be oriented parallel to shaft 22 and which may be movable in an axial direction of selector lever assembly 10. The pawl 26 may be moved downward by pushing button 28 provided on the hand grip 12 and described in greater detail below. A positioning plate 30 integral with or adjacent to brackets 16 is formed with an arcuately extending aperture 32 into which a portion of the lower rod 26 is inserted to retain the selector lever 10 in a desired position. Interconnecting pawl 26 to button 28 is an actuator assembly having an upper rod 36 interconnected to button 28 by at least one non-Newtonian flow fluid-locking actuating member such as 40 disclosed in any one of U.S. Pat. Nos. 5,277,281; 5,284,330; 5,492,312; 5,816,372; 5,711,746, all assigned to the Lord Corporation, the disclosures of which are incorporated herein by reference.

Figure 3:
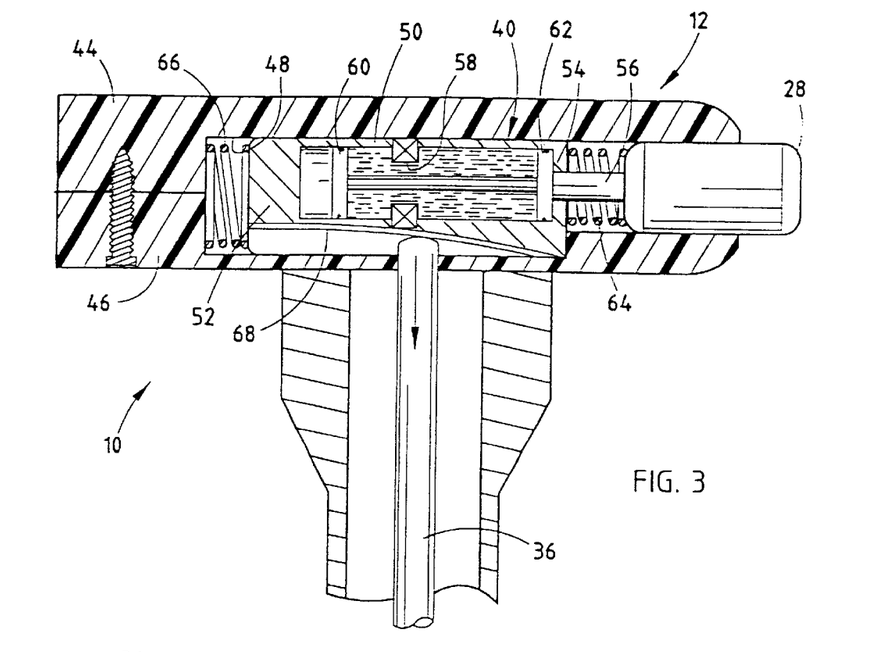
FIG. 3 is a enlarged schematic view of a handle portion of the brake-transmission interlock system of FIG. 1.
Figure 4:
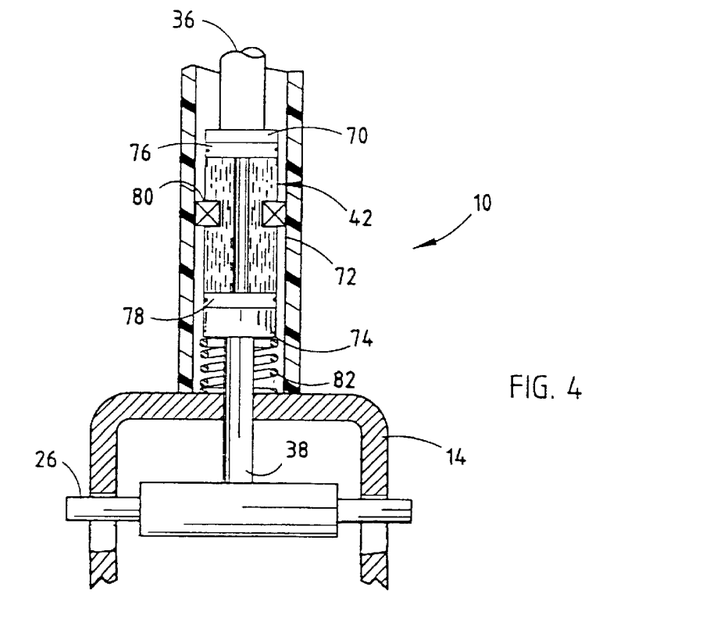
FIG. 4. is an enlarged schematic view of a lower portion of the brake-transmission interlock system shown in FIG. 1.

FIG. 3 schematically illustrates one example of a fluid locking member 40 wherein the button 28 is horizontally actuated. The handle member 12 may include an upper portion 44 and lower portion 46, the latter of which may be fixed to the upper end of the lever shaft 47. The two portions 44, 46 of the handle can define an interior cavity 48 configured to receive the fluid locking member 40. The fluid locking member can include a housing 50 preferably in the shape of a right circular cylinder closed at one end 52 and having an opening at an opposite end 54 of sufficient diameter to permit the passage of a shaft 56 there through. The central or intermediate portion 58 of the housing may be of a reduced diameter intermediate portion to create a constriction generally uniformly about the perimeter and around shaft 56. The specific dimension of the reduced intermediate portion (RIP) 58 may vary depending upon the diameter of the shaft 56. In the instant case, RIP 58 essentially divides the housing 50 into two chambers, each containing a respective piston 60 and 62. Each of the pistons 60, 62 may have a diameter substantially equal to the interior diameter of the respective chambers. O-rings or similar seals may extend around the circumference of each piston to form a tight seal with the interior wall of the chamber. A specific volume is defined between the inwardly facing surfaces of the pistons and the interior wall of the two chambers. Disposed within this volume is the non-Newtonian flow fluid similar to that disclosed in the patents owned by the Lord Corporation. The portions of the respective chambers outboard of the pistons are preferably vented to ambient through holes extending through the end walls of the housing to prevent hydraulic lock.

Disposed around the housing 50 within the RIP 58 could be a device for generating a magnetic field within the interior of the housing 50, and particularly across the inside diameter of the RIP 58. In a preferred embodiment, the device includes a wire coil operably connected to a power supply. Referring again to FIG. 3, the right hand end of shaft 56 is connected to button 28. Disposed between the end 54 of the housing 50 and button 28 is a spring 64. Additionally, a second spring 66 may be disposed between the end 52 of the housing 50 and the inside wall of the chamber 48. Although the general shape of the housing 50 is described as a right circular cylinder, a portion indicated by reference numeral 68 includes a cam surface which is configured to engage the upper end of the upper rod 36.

In addition to, or in an alternate embodiment, the fluid locking member 42 (FIG. 4) may be located lower in the lever assembly 10. It is certainly contemplated that one or both of the fluid locking members 40 or 42 may be incorporated in a single structure. In the embodiments shown, the lower end of upper rod 36 extends through the upper end of the fluid locking member housing 72. The lower end 74 of the housing 72 is connected to intermediate rod 38 which in turn is coupled to pawl 26. Just as in the previous embodiment, housing 72 is preferably in the form of a right circular cylinder having a diameter sufficient to slide up and down within the interior of the lever 10. The lower end of upper rod 36 extends through the upper end 70 of the housing and is coupled to spaced pistons 76 and 78 disposed on opposite sides of the RIP 80. Other than the orientation, the fluid locking member 42 may be substantially identical in all respects to fluid locking member 40 described earlier. Disposed between the lower end 74 of the housing 72 and the upper end of the clevis 14 and substantially inscribing or encircling the intermediate rod 38 is a spring 82 configured to urge the rods 26, 36, 38 upwardly. Just as in the previous embodiments, RIP 80 is configured to house a wire coil operably connected by conductors to an integrated circuit and power supply.

Figure 5:
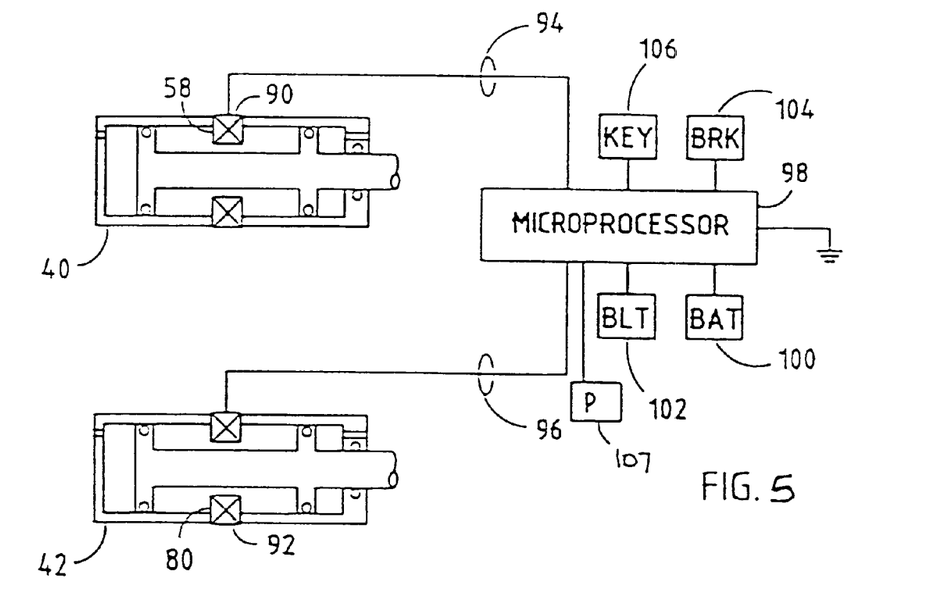
FIG. 5 is a schematic diagram of a circuit forming a portion of the brake-transmission interlock system embodying the invention.

FIG. 5 illustrates schematically one circuit which may be operably connected to the upper fluid locking member 40 and the lower fluid locking member 42. As mentioned previously, each of the locking members may include a coil which extends around the RIP generally designated as 90 in the upper locking member 40 and 92 in the lower locking member 42. The coils 90, 92 may be coupled by conductors 94 and 96 to an integrated circuit or computer generally identified as 98. The IC or computer may also be operably coupled to a vehicle battery 100 and receive input signals from sensors or detectors, for example those located at seat belt reel 102, the brake mechanism 104, the ignition system 106 and a park position switch 107. Any one or more of these systems 102, 104, 106 or 107 individually or in combination may control the output by the IC over conductors 94 and 96 to the fluid locking members 40 and 42.

In a preferred method of operation, and as shown in FIGS. 1 through 5, with the input from the ignition system 106 in the "off" position, no power from the battery 100 is transmitted by the IC to coil 90 or coil 92 to produce a field the fluid. In the absence of the field, the non-Newtonian fluid in each locking member is permitted to pass through the RIP, thus no horizontal translation of the housing 50 nor vertical translation of the housing 72 occurs. In this fashion the spring 66 in the handle 12 and spring 82 above the clevis 14 prevent vertical actuation of the upper, intermediate and lower rods 26, 36 and 38, thus preventing movement of the shifter out of the "park" position. When the ignition switch is moved to the "on" position, the IC 98 receives a signal from detector 106 which permits battery power to be transferred over conductor 94 to the coil 90 and locking the respective positions of the piston within the housing. This, in essence, permits the actuation of the button 28 to be transferred to the housing 50 resulting in horizontal translation and a depression of the upper rod 36. At this point power is not passed over conductor 96 to coil 92. Spring 82 places a positive load on intermediate rod 38 maintaining the pawl 26 in the "P" position. Power is transmitted to coil 92 over conductor 96 upon a signal from the brake sensor 104 and possibly seat belt sensor 102. Upon receipt of one or more of these signals, the operator is able to depress the pawl 26 and disengage from the park position. Thereafter, the park switch 107 is normally closed and keeps current to coil 92 so the operator may shift. The park switch is open and current to coil 92 is interrupted when the pawl 26 is moved to the "P" position and the operator releases the brake.

Figure 6:
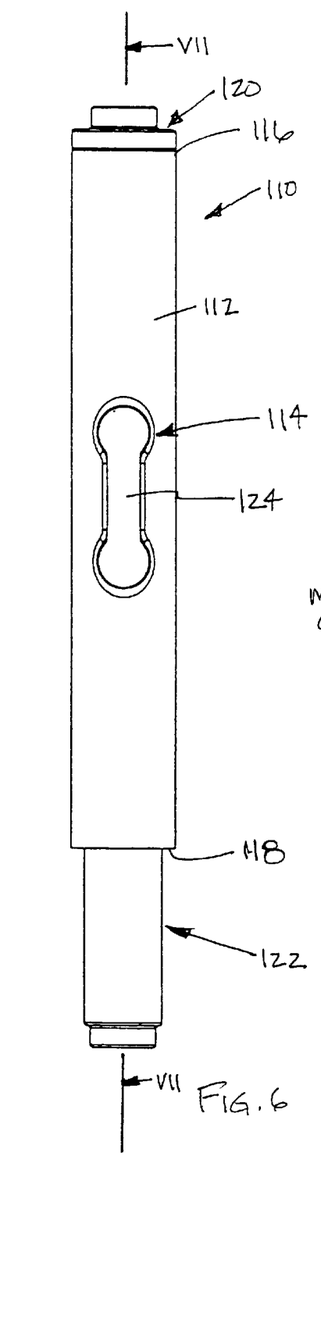
FIG. 6 is an elevation view of an alternate embodiment of a fluid locking member.
Figure 7:
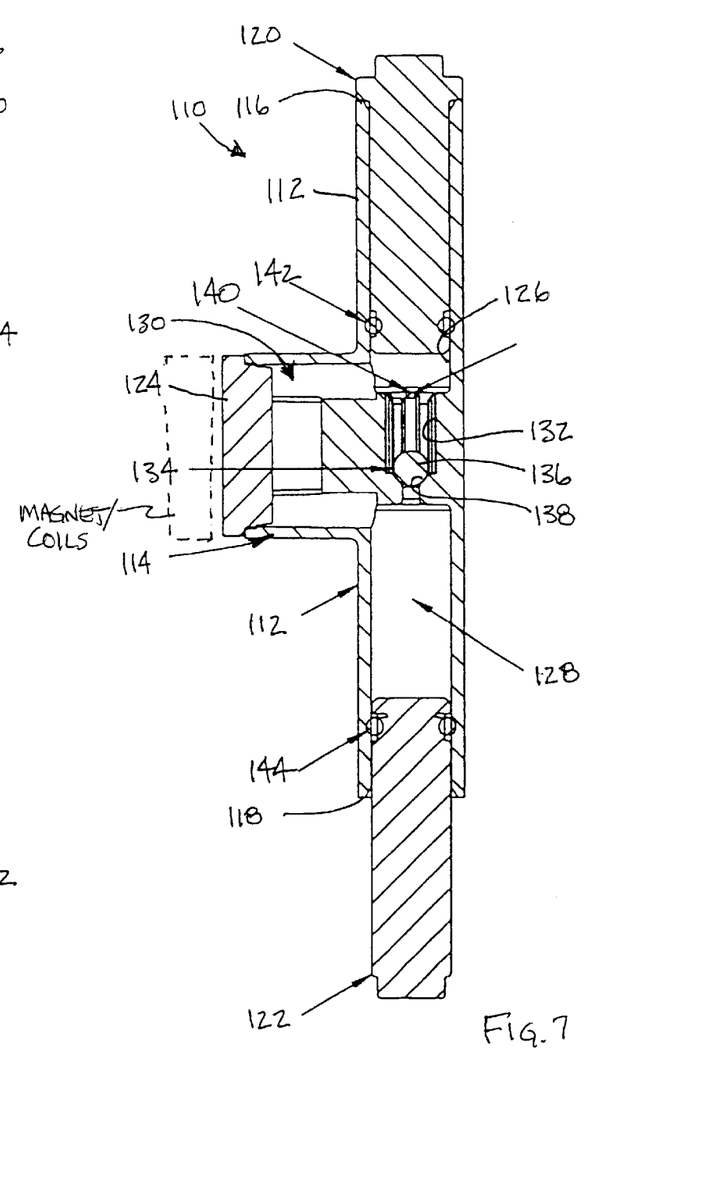
FIG. 7 is a cross-section view of the fluid locking member shown in FIG. 6, taken along line VII—VII.

It is contemplated that other forms of the fluid locking members, in addition to those described above, may be used in association with the instant invention. For example, an alternate example of the fluid locking mechanism is illustrated in FIGS. 6 and 7. As shown in the Figures, a locking member 110 may include a hollow or tubular right circular cylinder housing 112 having a general oval-shaped lateral extension portion 114. Disposed in the upper and lower ends of the housing 116, 118, respectively are pistons 120, 122, both configured to extend and retract axially within housing 112. Attached to the top of extension portion 114 is a cap 124 sealing the generally hollow interior.

As best illustrated by FIG. 7, member 110 may include an upper and lower longitudinal chamber 126, 128 respectively, each in fluid communication with the other through bypass 130 defined within the oval extension portion 114. Also interconnecting chambers 126, 128 may be an axial passage 132. In a preferred embodiment, axial passage 132 includes a check valve 134 formed by a ball 136 sealing against seat 138. Clips or keepers 140 may extend diametrically across axial passage 132 to retain the ball 136 therein. Thus, in this configuration, if fluid is unable to flow through bypass 130, fluid should only be able to flow from chamber 128 past check valve 134 and into chamber 126 for reasons which will become apparent below.

As briefly mentioned above, pistons 120, 122 are slidably disposed within the ends 116, 118 respectively of the housing 112. To ensure a tight seal with an interior wall of each chamber 126, 128, each piston includes seals generally designated by reference numerals 142, 144. Together with cap 124, the volume within bypass 130, chambers 126, 128 and between the inner ends of the pistons is sealed. In the preferred embodiment, the volume is filled with a non-Newtonian flow fluid such as one of the types described in the aforementioned patents owned by the Lord Corporation. For the purposes of this description, this fluid will also be referred to as a magneto rheological fluid or a locking fluid, all considered to refer substantially to a fluid having the same flow characteristics when exposed to a magnetic field. In other respects, the fluid may be akin to a hydraulic fluid in that it is substantially incompressible, free of air bubbles and the like, and completely filling chamber 126,128, check valve 134, and bypass 130.

With reference to the embodiment of the locking member 110 shown in FIGS. 6 and 7, the reader should note it is preferred, but not necessary, to reduce the size of the passage extending through bypass 130 from those of chambers 126, 128. The intent of the size reduction is to maximize the affect of any magnetic field or flux on the locking fluid passing through the bypass. That is to say, when the locking fluid is exposed or placed in a magnetic field, the flow characteristics of the locking fluid change, becoming more viscous, and can substantially become so viscous that flow becomes extremely difficult through small passages. Thus in a magnetic field free environment, the locking fluid would preferably flow freely between chambers 126, 128 through bypass 130. In the presence of a magnetic field, and particularly one passing through bypass 130, the locking fluid may be too viscous to pass, thus stopping flow and preventing axial movement of pistons 120, 122, causing locking member 110 to act as a substantially rigid body. In the preferred embodiment, the strength of the magnetic field may be calculated so as not to extend too far and impact upon the fluid in chambers 126, 128, but may do so upon the desired application. However, it is believed that fluid should be free to pass upwardly into chamber 126 through valve 134 to reset the initial positions of the pistons 120, 122 at the beginning of the desired cycle with or without the presence of a magnetic field across bypass 130.

With respect to the source of the magnetic field, it is contemplated that a permanent magnet generally positioned relatively proximate cap 124 should be sufficient to place a continuous magnetic field across the bypass 130. It is further contemplated that an electromagnetic field, produced by coils located at about the same location as the magnet, could be constructed to counteract the field produced by the magnet, rendering the field neutral. By turning the coils on and off using an electric current, the locking member may be compliant, permitting movement of the pistons, or rigid, locking the pistons when pressure is applied in a predetermined direction.

Various changes, alternatives, and modifications will become apparent to those of ordinary skill in the art following a reading of the foregoing description. For example, although coils have been described to be used in connection with the fluid locking members, it will be appreciated that electromagnets or permanent magnets may be utilized to provide some or all of the magnetic field. The intensity or strength of the magnetic flux through the fluid may be changed by altering the distance of the magnets or electromagnets from the RIP of the cylinder. Additionally, although cylinder 42 is described as being located above pawl 26, it is contemplated that the cylinder may be located below the pawl and in the locked position once the ignition switch is on to keep a load thereon. The cylinder is de-energized upon application of the brake as well as possibly an input from the seat belt sensor. It is further contemplated the instant invention may be adapted for use in steering-column mounted shifter assemblies as well as other lever mechanisms. Moreover, the instant invention could assist in controlling the tactile characteristics of the shifter. It is intended that all such changes, alternatives or modifications are within the scope of the foregoing description and considered a part of the present invention.

The embodiments of the invention in which an exclusive property or privilege is claimed are defined as follows:

I claim:

1. A locking mechanism for a vehicle transmission shifter comprising:
   a pawl movable by operation of a first magnetic fluid locking member connected to said pawl; and
   a shift lock plate having at least one detent therein engaged by at least a portion of said pawl.

2. The locking mechanism as defined in claim 1, comprising:
   a magnetic source connected to the locking mechanism and proximate said first fluid locking member with the transmission shifter in a first position to selectively lock and unlock the transmission shifter.

3. The locking mechanism as defined in claim 2, comprising:
   at least one of a braking operation and a key operation cooperating with said magnetic source to selectively lock and unlock said first fluid locking member.

4. The locking mechanism as defined in claim 3, wherein said magnetic source includes:
   a permanent magnet; and
   an electromagnet proximate said permanent magnet for neutralizing a magnet field produced by said permanent magnet.

5. The locking mechanism as defined in claim 4, further comprising a second fluid locking member disposed at a first end of the transmission shifter to enable an operator to selectively actuate said first fluid locking member.

6. The locking mechanism as defined in claim 5, further comprising:
   at least one of a braking operation and a key operation cooperating with said second fluid locking member to selectively lock and unlock said second fluid locking member.

7. The locking mechanism as defined in claim 1, wherein said first fluid locking member comprises:
   a tubular housing having an intermediate restriction;
   at least one piston disposed within said tubular housing; and
   a magneto rheological fluid disposed within said tubular housing and in fluid communication through said restriction;
   wherein flow characteristics of said magneto rheological fluid are transformed by the presence and absence of an electromagnetic field around said restriction, thus locking and unlocking movement of said at least one piston.

8. The locking mechanism as defined in claim 7, further comprising:
   a check valve disposed within said tubular housing for permitting one way flow of magneto rheological fluid around said restriction.

9. A transmission shifter assembly, comprising:
   a lever assembly having a lower end coupled to at least one linking lever such that movement of said lever assembly results in movement of said linking lever to select a desired gear;
   a pawl attached to said lower end of said lever assembly and movable between a magnetic first and second position;
   a fluid locking member interconnected to said pawl for selectively moving said pawl between said first and second positions; and
   a positioning plate proximate said lever assembly and having a plurality of detents therein to receive at least a portion of said pawl and selectively fix a position of said lever assembly.

10. The transmission shifter assembly as defied in claim 9, further comprising:
    at least one of a braking operation and a key operation cooperating with said fluid locking member to selectively lock and unlock said fluid locking member.

11. The transmission shifter assembly as defined in claim 10, further comprising:
    a magnetic field generator adjacent said fluid locking member, and cooperating with at least one of said braking operation and said key operation to selectively lock and unlock said fluid locking member.

12. The transmission shifter assembly as defined in claim 9, wherein said actuator assembly comprises at least one fluid locking member having one end attached to said pawl.

13. The transmission shifter assembly as defined in claim 9, wherein said fluid locking member comprises at least two fluid locking members arranged in tandem, with one of said fluid locking members having an end attached to said pawl.

14. The transmission shifter assembly as defined in claim 11, wherein said magnetic field operator includes:
    a permanent magnet; and
    a coil adjacent said magnet for selectively producing a magnetic field canceling that of said permanent magnet.

15. The transmission shifter assembly as defined in claim 9, wherein said fluid locking member comprises:
    a tubular housing;
    a passage extending substantially longitudinally through said tubular housing;
    at least one linear actuator disposed within said passage; and
    a magneto rheological fluid substantially filling said passage and contained by at least one side of said linear actuator.

16. The transmission shifter assembly as defined in claim 9, wherein said fluid locking member includes an opposite end adopted to be depressed by an operator.

17. A transmission shifter assembly comprising:
    a lever having a first end and a second end, said second end interconnected to at least one linking lever such that movement of said first end results in a corresponding movement of said lining lever;
    a positioning plate adjacent said lever and having at least one aperture therein;
    a locating assembly cooperating with said lever and configured to selectively engage said aperture for fixing a location of said lever; and
    a magneto rheological fluid filling said housing and in contact with at least one magnetic face of said linear actuator; and
    an assembly for selectively generating a magnetic field about said magneto rheological fluid when said lever is in a predetermined position.

18. The transmission shifter assembly as defined in claim 17, further comprising:
    an assembly for producing a magnetic field in a predetermined position relative to said lever; and
    at least one of a braking operation and a key operation cooperating with said assembly for producing a magnetic field to selectively lock and unlock said fluid locking member.

19. A transmission shifter assembly, comprising:
    a lever having one end interconnected to at least one linking lever to select a desired gear;
    an assembly connected to said lever for selectively locating said lever at a selected gear position; and
    at least one magnetic fluid locking assembly interconnected to said assembly for selectively locating said lever for selectively locking said lever at a desired position and preventing accidental dislodgement of said lever.

20. The transmission shifter assembly as defined in claim 19, wherein said at least one fluid locking assembly includes;

a housing;

at least one linear actuator disposed within said housing;

a magneto rheological fluid filling said housing and in contact with at least one face of said linear actuator; and an assembly for selectively generating a magnetic field about said magneto rheological fluid when said lever is in a predetermined position.

21. A transmission shifter assembly, comprising:

a lever assembly;

a pawl attached to a lower end of said lever assembly and movable between a first and second position;

an actuator assembly interconnected to said pawl for selectively moving said pawl between said first and second position;

a field generator next to said actuator assembly, cooperating with at least one of a brake operation and an ignition operation to selectively lock and unlock said actuator assembly; and a positioning plate proximate said lever assembly and having a plurality of detents therein to receive at least a portion of said pawl and selectively fix a position of said lever assembly.

22. A transmission shifter assembly, comprising:

a lever assembly pivotally coupled at a lower end to a base;

a pawl attached to said lower end of said lever assembly and translatable between a first and second position;

at least one magnetic fluid locking assembly interconnected to said pawl for selectively translating said pawl between said first and second position; and a plate proximate said lever assembly and having a plurality of detents to receive at least a portion of said pawl and selectively fix a position of said lever assembly.

23. A lever assembly, comprising:

a lever;

a pin mounted on said lever and translatable between a first and second position;

a magneto-rheological locking member interconnected to said pin for selectively translating said pin between said first and second position; and a plate, having at least one detent proximate said lever, such that at least a portion of said pin is received within said detent to selectively fix a position of said lever.

* * * * *